(12) United States Patent
Yu et al.

(10) Patent No.: US 7,859,451 B2
(45) Date of Patent: Dec. 28, 2010

(54) METHOD AND SYSTEM FOR MONOPULSE RADAR TARGET ANGLE DETERMINATION

(75) Inventors: Kai-Bor Yu, Nishkayuna, NY (US); Peter G. Kaup, Marlton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 218 days.

(21) Appl. No.: 12/273,111

(22) Filed: Nov. 18, 2008

(65) Prior Publication Data

US 2010/0123617 A1 May 20, 2010

(51) Int. Cl.
 *G01S 13/44* (2006.01)
(52) U.S. Cl. .......................... 342/149; 342/152; 342/80; 342/133; 342/139; 342/140; 342/146
(58) Field of Classification Search .................. 342/149, 342/152, 154, 157–158, 80, 107–108, 113, 342/133, 139–140, 146
See application file for complete search history.

(56) References Cited

U.S. PATENT DOCUMENTS

| | | | | |
|---|---|---|---|---|
| 4,926,184 | A * | 5/1990 | Galati et al. | 342/149 |
| 5,059,968 | A * | 10/1991 | Thompson et al. | 342/152 |
| 5,302,961 | A | 4/1994 | Murrow et al. | |
| 5,576,711 | A * | 11/1996 | Morris et al. | 342/152 |
| 6,087,974 | A | 7/2000 | Yu | |
| 6,404,379 | B1 | 6/2002 | Yu et al. | |
| 7,136,014 | B2 * | 11/2006 | McCord et al. | 342/149 |
| 7,250,902 | B2 * | 7/2007 | Manoogian et al. | 342/154 |
| 7,671,789 | B1 * | 3/2010 | Yu | 342/152 |
| 2003/0085833 | A1 * | 5/2003 | Yu | 342/17 |
| 2006/0109172 | A1 * | 5/2006 | McCord et al. | 342/149 |
| 2010/0123617 | A1 * | 5/2010 | Yu et al. | 342/149 |

FOREIGN PATENT DOCUMENTS

| EP | 1167995 A2 * | 1/2002 |
|---|---|---|
| JP | 06289130 A * | 10/1994 |
| JP | 2002257929 A * | 9/2002 |

OTHER PUBLICATIONS

Applebaum, S.P. and Wasiewicz, R., "Main Beam Jammer Cancellaton for Monopulse Beams", Final Report, DTIC, RADC-TR-84267, Dec. 1984, 113 pages.

* cited by examiner

*Primary Examiner*—John B Sotomayor
(74) *Attorney, Agent, or Firm*—Howard IP Law Group, PC (57) ABSTRACT

A method for determining target angles based on data received from a monopulse radar array antenna includes receiving from a beamformer that generates beams from signals generated by the monopulse radar antenna signals having data indicative of a sum beam, an azimuth difference beam, an elevation difference beam, and a delta-delta beam; based on the received signals, determining by the processor an azimuth monopulse ratio, an elevation monopulse ratio, a first complementary monopulse ratio based on the ratio of the delta-delta beam to the delta elevation beam, and a second complementary monopulse ratio based on the ratio of the delta-delta beam to the delta azimuth beam; determining an azimuth angle by the processor based on the azimuth monopulse ratio and the first complementary monopulse ratio; determining an elevation angle by the processor based on the elevation monopulse ratio and the second complementary monopulse ratio; providing an output signal indicative of the azimuth angle; and providing an output signal indicative of the elevation angle.

20 Claims, 10 Drawing Sheets

METHOD AND SYSTEM FOR MONOPULSE RADAR TARGET ANGLE DETERMINATION

FIELD OF INVENTION

The present invention relates to methods and systems for determining target angles based on data from monopulse array-type radar systems.

BACKGROUND

Figure 1:
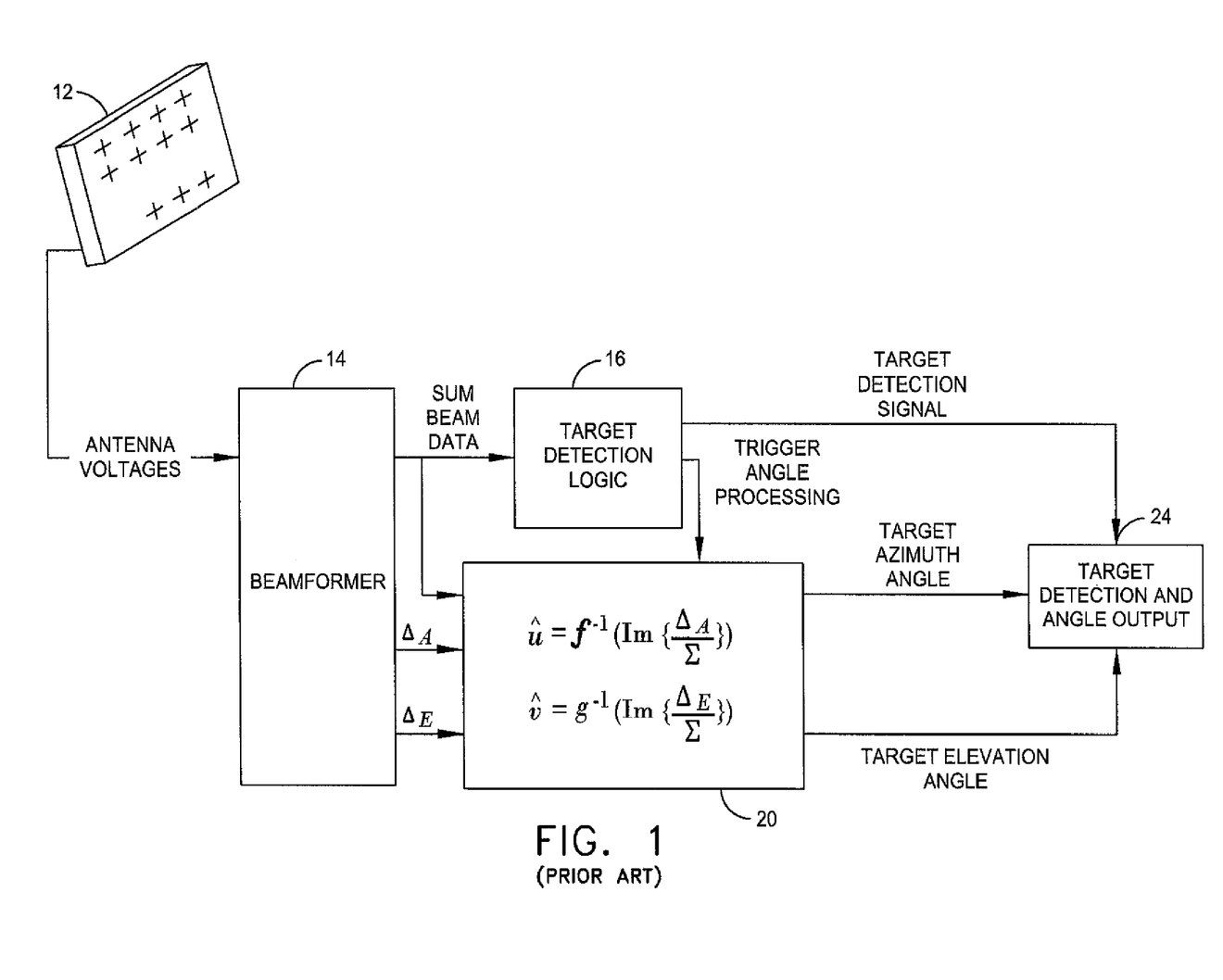
FIG. 1 is a schematic diagram of a prior art method for determining target angles based on data from a monopulse radar array.

Monopulse radar systems are used for searching for targets and for tracking targets. In monopulse radar systems, information concerning the angular location of a source or target is obtained by comparison of signals received in two or more simultaneous antenna beams. Referring to FIG. 1, monopulse radar systems have array radar antennas, such as antenna 12, that output antenna voltage data to beamformer 14. In searching for targets, such a system may interrogate a grid of angular positions using a single monopulse transmission beam set formed by beamformer 14. Beamformer 14 forms a detection sum beam, which is output to a processor, and processed using target detection logic 18 to determine whether a target is present. Beamformer 14 also forms orthogonal difference beams, i.e., azimuth difference beam and an elevation difference beam, which may be output to a processor. If target detection logic 18 indicates that a target is detected, the processor may provide an indication to trigger angle processing, and may then determine the angle of arrival of the target using the two orthogonal difference beams. The processor may simultaneously calculate the ratios of the difference beams to the sum beam, thus determining the azimuth and elevation monopulse ratios, and determine, from a look up table, the corresponding azimuth and elevation angles 20. The elevation and azimuth angles may then be output by a processor to a target detection and angle output 22. This process provides an estimate of the angular location of the target in the elevation and azimuth axes. This approach suffers a beam-shape loss (i.e., a decreased signal to noise ratio due to decreased antenna gain), when the target is off the beam steering direction (i.e. off the center of the beam set). As the angular distance of the target from the beam center or boresight increases, the signal to noise ratio decreases. This approach has maximum gain response and, as a result, best angle estimation performance, at the peak of the sum beam.

Monopulse radar systems similarly perform a tracking function on targets of interest. Equivalent angle estimation beam shape loss occurs in tracking targets. The extent of allowable loss affects the revisit rate of the track function. The quality of the tracking and maximum maneuver capability of the target determine how often the track must be revisited to keep the beam steering direction close enough to the actual target to avoid losing the target.

In monopulse radar processing, antenna beamforming is performed to generate the sum beam, the delta-azimuth beam and the delta-elevation beam. A processor uses target detection logic to compare the magnitude of the sum beam to a threshold. Detection is declared when the magnitude of the sum beam output is above the threshold. When a target is detected, the azimuth and elevation monopulse ratios are formed by using the delta-azimuth beam and the delta-elevation beam in addition to the sum beam. The directional cosines (i.e. in u- and v-space) or the corresponding azimuth and elevation angles are then determined by consulting a look-up table or by using a one-dimensional polynomial function. The determination of the directional cosine for the azimuth angle may be expressed as $$\hat{u} = f^{-1}\left(\operatorname{Im}\left\{\frac{\Delta_A}{\Sigma}\right\}\right),$$

where $\Delta_A$ is the delta-azimuth beam, $\Sigma$ is the sum beam, and $$\operatorname{Im}\left\{\frac{\Delta_A}{\Sigma}\right\}$$

is the imaginary part of the ratio, or the imaginary part of the azimuth monopulse ratio. It will be appreciated that the real part of the monopulse ratio may also be used depending on the convention used. The function $f^{-1}$ denotes a look up table to determine the u directional cosine. Similarly, the determination of the directional cosine for the elevation angle may be expressed as $$\hat{v} = g^{-1}\left(\operatorname{Im}\left\{\frac{\Delta_E}{\Sigma}\right\}\right),$$

where $\Delta_E$ is the delta-elevation beam, $\Sigma$ is the sum beam, and $$\operatorname{Im}\left\{\frac{\Delta_E}{\Sigma}\right\}$$

is the imaginary part of the elevation monopulse ratio. The function $g^{-1}$ denotes a look up table to determine the v directional cosine. The real part of the monopulse ratio may also be used depending on the convention used.

As noted above, the above approach suffers from beam-shape loss. The effects of beam-shape loss can be ameliorated by transmitting at higher power; however, the use of higher power transmissions will mean the use of excessively high power levels, and thus unnecessary and wasteful use of power, if the target is at the center or the vicinity of the center of the beam. For search, the effects of beam shape loss may be ameliorated by packing the beams closer together; however, packing the beams closer together results in greater use of processing resources or slower searching. For tracking, a higher update rate may be employed to ameliorate the effects of beam shape loss; however, a higher update rate uses more transmission power and processing resources.

SUMMARY OF THE INVENTION

In one embodiment of the invention, a computer-implemented method for determining target angles based on data received from a monopulse radar array antenna includes receiving by a processor of the computer, from a beamformer that generates beams from signals generated by the monopulse radar array antenna, signals having data indicative of a sum beam, an azimuth difference beam, an elevation difference beam, and a delta-delta beam; based on the received signals, determining by the processor an azimuth monopulse ratio, an elevation monopulse ratio, a first complementary monopulse ratio based on the ratio of the delta-delta beam to the delta elevation beam, and a second complementary monopulse ratio based on the ratio of the delta-delta beam to the delta azimuth beam; determining an azimuth angle by the processor based on the azimuth monopulse ratio and the first complementary monopulse ratio; determining an elevation angle by the processor based on the elevation monopulse ratio and the second complementary monopulse ratio; providing an output signal indicative of the azimuth angle; and providing an output signal indicative of the elevation angle.

In another embodiment, a system for determining target angles based on data received from a monopulse radar array antenna includes a memory device and a processor coupled to the memory device. The processor is adapted to: receive from a beamformer that generates beams from signals generated by the monopulse radar array antenna signals having data indicative of a sum beam, an azimuth difference beam, an elevation difference beam, and a delta-delta beam; based on the received signals, determine an azimuth monopulse ratio, an elevation monopulse ratio, a first complementary monopulse ratio based on the ratio of the delta-delta beam to the delta elevation beam, and a second complementary monopulse ratio based on the ratio of the delta-delta beam to the delta azimuth beam; determine an azimuth angle based on the azimuth monopulse ratio and the first complementary monopulse ratio; determine an elevation angle based on the elevation monopulse ratio and the second complementary monopulse ratio; provide an output signal indicative of the azimuth angle; and provide an output signal indicative of the elevation angle.

In an embodiment, a method for determining target angles based on data received from a monopulse radar array antenna having a plurality of elements includes: forming by a beamformer based on signals generated by the monopulse radar array antenna signals having data indicative of a sum beam, an azimuth difference beam, an elevation difference beam, and a delta-delta beam; based on the received signals, determining by the processor an azimuth monopulse ratio, an elevation monopulse ratio, a first complementary monopulse ratio based on the ratio of the delta-delta beam to the delta elevation beam, and a second complementary monopulse ratio based on the ratio of the delta-delta beam to the delta azimuth beam; determining an azimuth angle by the processor based on the azimuth monopulse ratio and the first complementary monopulse ratio; determining an elevation angle by the processor based on the elevation monopulse ratio and the second complementary monopulse ratio; providing an output signal indicative of the azimuth angle; and providing an output signal indicative of the elevation angle.

DETAILED DESCRIPTION

It is to be understood that the figures and descriptions of the present invention have been simplified to illustrate elements that are relevant for a clear understanding of the present invention, while eliminating, for the purpose of clarity, many other elements found in typical radar antenna arrays and signal processing systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Figure 2:
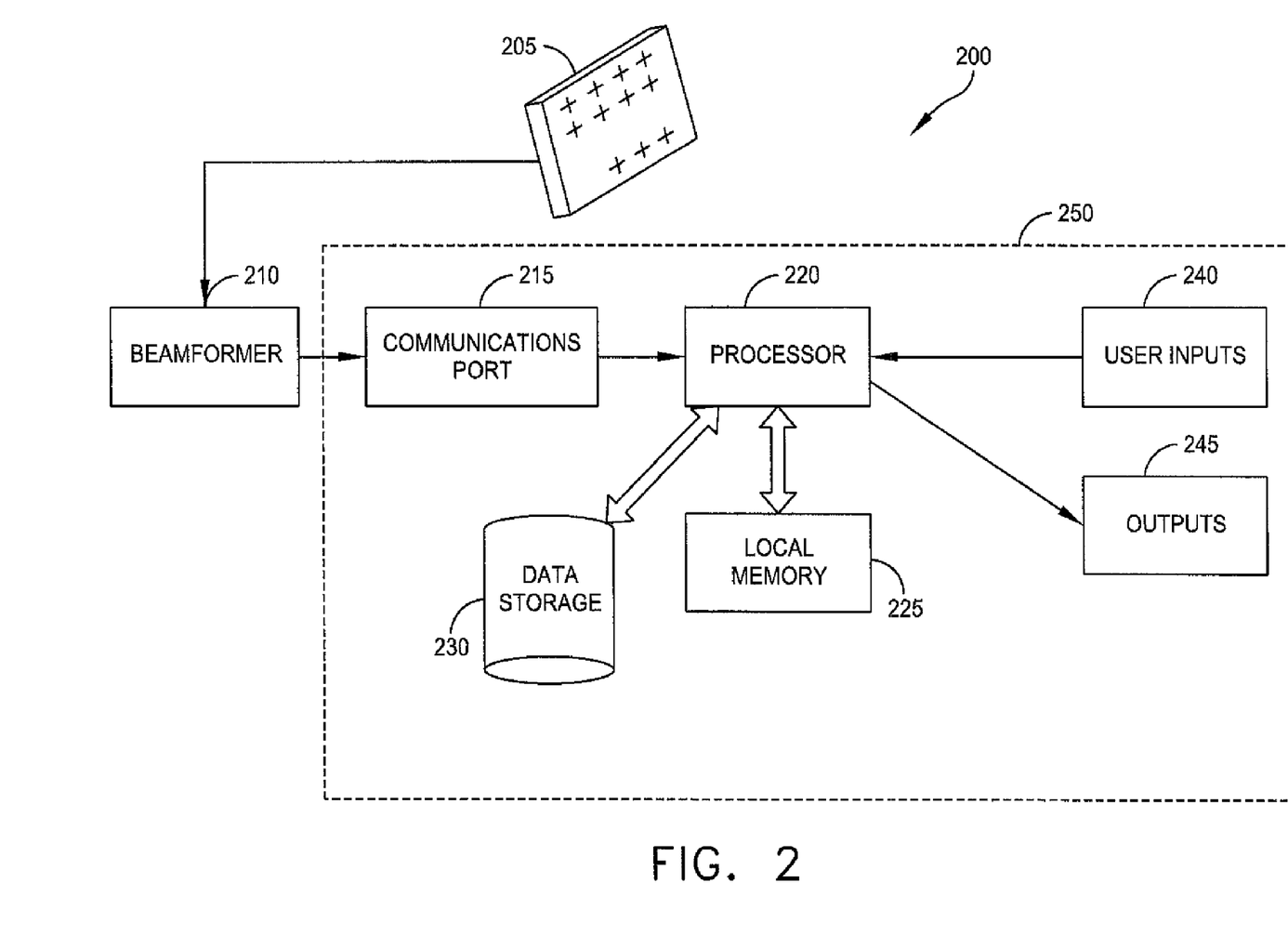
FIG. 2 is a schematic diagram of a system for determining target angles based on data from a monopulse radar array.

FIG. 2 is a schematic diagram of a system 200 for determining target angles based on data from a monopulse radar array 205. Radar array 205 may have any suitable shape, including rectangular. Element voltages are output by array 205 to beamformer 210. Beamformer 210 may be an analog beamformer or a digital beamformer. Beamformer 210 outputs signals indicative of beams to computer 250, and more particularly to processor 220 via communications port 215. Processor 220 may be a digital processor, such as a processor of a general purpose computer executing instructions embodied in software stored in a computer accessible memory, a special purpose computer, a field programmable gate array (FPGA) or dedicated digital signal processing (DSP) chips, by way of non-limiting example. Processor 220 is coupled to memory devices, such as local memory 225, which may include RAM and other local high-speed memory devices and local permanent memory devices, such as hard drives, tape drives and flash memories, and data storage 230, which may be a hard drive, tape drive, flash memory, or a remote storage device, such as a remote server having memory resources accessible by processor 220 over a local area network, wide area network, the Internet, or other network. User inputs 240 may include keyboards, pointing devices such as mice and trackballs, and touch-sensitive screens and other touch-sensitive membranes. Outputs 250 may include displays, printers, speech generation devices, and other type of human-perceptible outputs.

Figure 3:
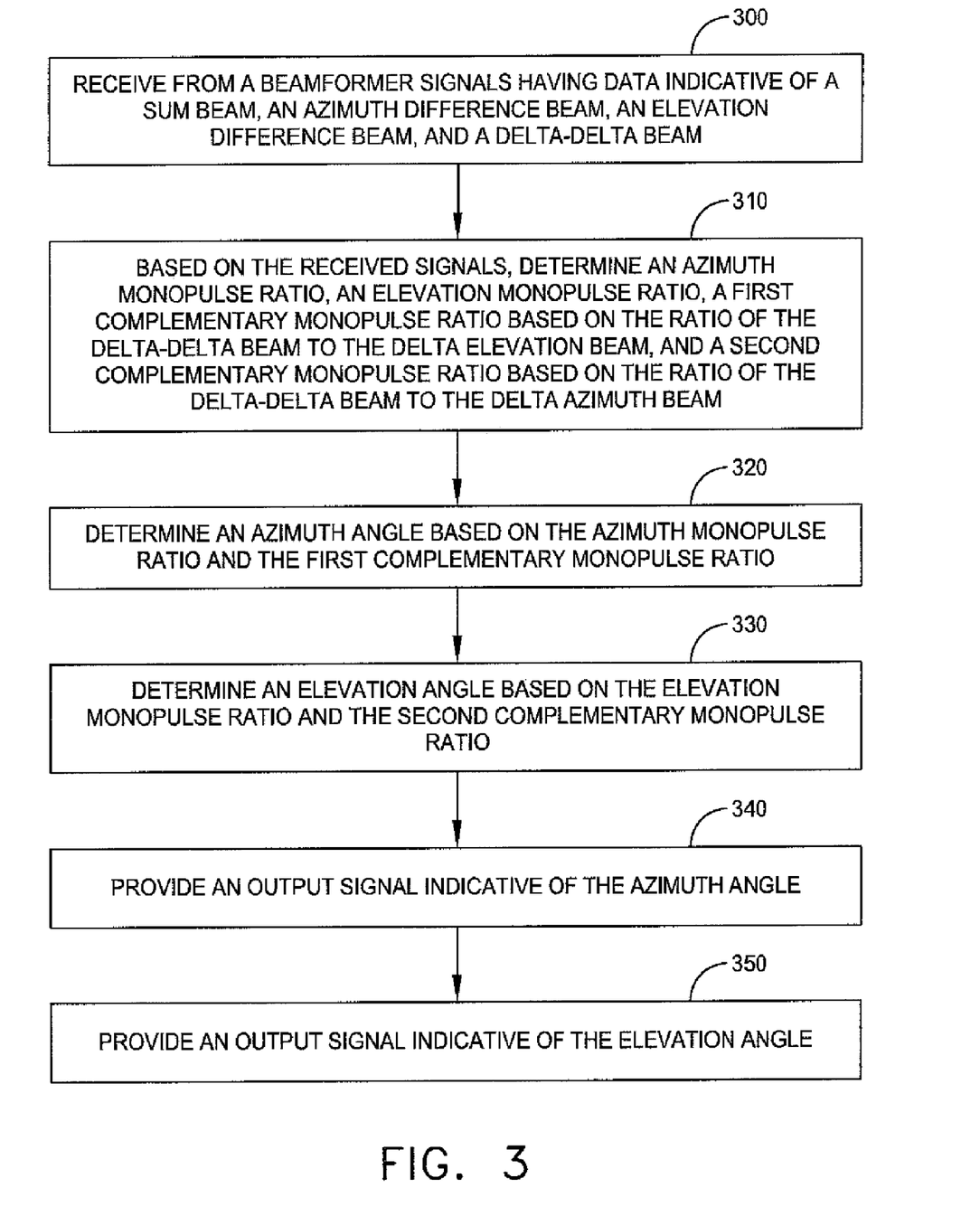
FIG. 3 is a process flow diagram of an exemplary process for determining target angles that may be executed by the processor of FIG. 2.

FIG. 3 is a process flow diagram of an exemplary method for determining target angles. The method of FIG. 3 may be a computer-implemented method for determining target angles based on data received from a monopulse radar array antenna, such as antenna 205 of FIG. 2. Referring again to FIG. 3, a processor receives 300 from a beamformer that generates beams from signals generated by the monopulse radar array antenna, signals having data indicative of a sum beam, an azimuth difference beam, an elevation difference beam, and a delta-delta beam. The computer may be computer 250 of FIG. 2; the processor may be processor 220 of FIG. 2, and the beamformer may be beamformer 210 of FIG. 2. The azimuth difference beam is also known as the delta-azimuth beam; the elevation difference beam is also known as the delta-elevation beam. The delta-delta beam is also known as the double difference beam. The generation of the sum beam, the azimuth difference beam, the elevation difference beam, and the delta-delta beam is well-known in the art. By way of non-limiting example, the generation of the four beams is disclosed in my U.S. Pat. No. 6,404,379, which is hereby incorporated herein by reference in its entirety. Analog beamformers are known that generate all four beams. Some existing analog beamformers generate all four beams, but, as the delta-delta beam is not typically used in processing, the delta-delta beam is terminated. In digital beamformers, the use of appropriate known coefficients provides the four beams.

Based on the received signals, the processor determines 310 an azimuth monopulse ratio, an elevation monopulse ratio, a first complementary monopulse ratio based on the ratio of the delta-delta beam to the delta elevation beam, and a second complementary monopulse ratio based on the ratio of the delta-delta beam to the delta azimuth beam. The term "complementary monopulse ratio" is a term coined by the inventor to refer to a monopulse ratio calculated by taking the ratio of a delta-delta beam to a delta elevation beam or a delta azimuth beam. Either the imaginary or the real components of the beams may be employed depending on the convention used. In an exemplary embodiment, the azimuth monopulse ratio $mr_{u_1}$ is expressed by the formula $$mr_{u_1} = \text{Im}\left\{\frac{\Delta_A}{\Sigma}\right\},$$

where $\Delta_A$ is the delta-azimuth beam, $\Sigma$ is the sum beam, and $$\text{Im}\left\{\frac{\Delta_A}{\Sigma}\right\}$$

is the imaginary part of the ratio, or the imaginary part of the azimuth monopulse ratio. The first complementary monopulse ratio $mr_{u_2}$ is based on the ratio of the delta-delta beam to the delta-elevation beam, and may be expressed by the formula $$mr_{u_2} = \text{Im}\left\{\frac{\Delta_\Delta}{\Delta_E}\right\},$$

where $\Delta_\Delta$ is the delta-delta beam, $\Delta_E$ is the delta-elevation beam, and $$\text{Im}\left\{\frac{\Delta_\Delta}{\Delta_E}\right\}$$

is the imaginary part of the ratio, or imaginary part of the first complementary monopulse ratio. The elevation monopulse ratio $mr_{v_1}$ may be expressed as $$mr_{v_1} = \text{Im}\left\{\frac{\Delta_E}{\Sigma}\right\},$$

where $\Delta_E$ is the delta-elevation beam, $\Sigma$ is the sum beam, and $$\text{Im}\left\{\frac{\Delta_E}{\Sigma}\right\}$$

is the imaginary part of the ratio, or the imaginary part of the elevation monopulse ratio. The second complementary monopulse ratio $mr_{v_2}$ is based on the ratio of the delta-delta beam to the delta-azimuth beam, and may be expressed by the formula $$mr_{v_2} = \text{Im}\left\{\frac{\Delta_\Delta}{\Delta_A}\right\},$$

where $\Delta_\Delta$ is the delta-delta beam, $\Delta_A$ is the delta-azimuth beam, and $$\text{Im}\left\{\frac{\Delta_\Delta}{\Delta_A}\right\}$$

is the imaginary part of the ratio, or the imaginary part of the second complementary monopulse ratio. Each of these monopulse ratios may be stored in memory by the processor.

The processor may then determine 320 an azimuth angle based on the azimuth monopulse ratio and the first complementary monopulse ratio. Further details regarding this determination step are explained below with reference to FIG. 4.

The processor may determine 330 an elevation angle based on the elevation monopulse ratio and the second complementary monopulse ratio. Further details regarding this determination step are explained below with reference to FIG. 5.

The processor may provide 340 an output signal indicative of the azimuth angle. The processor may provide 350 an output signal indicative of the elevation angle. In an embodiment, the output signals may be displayed by a display device, which may display a visual indication of the azimuth angle and the elevation angle.

Figure 4:
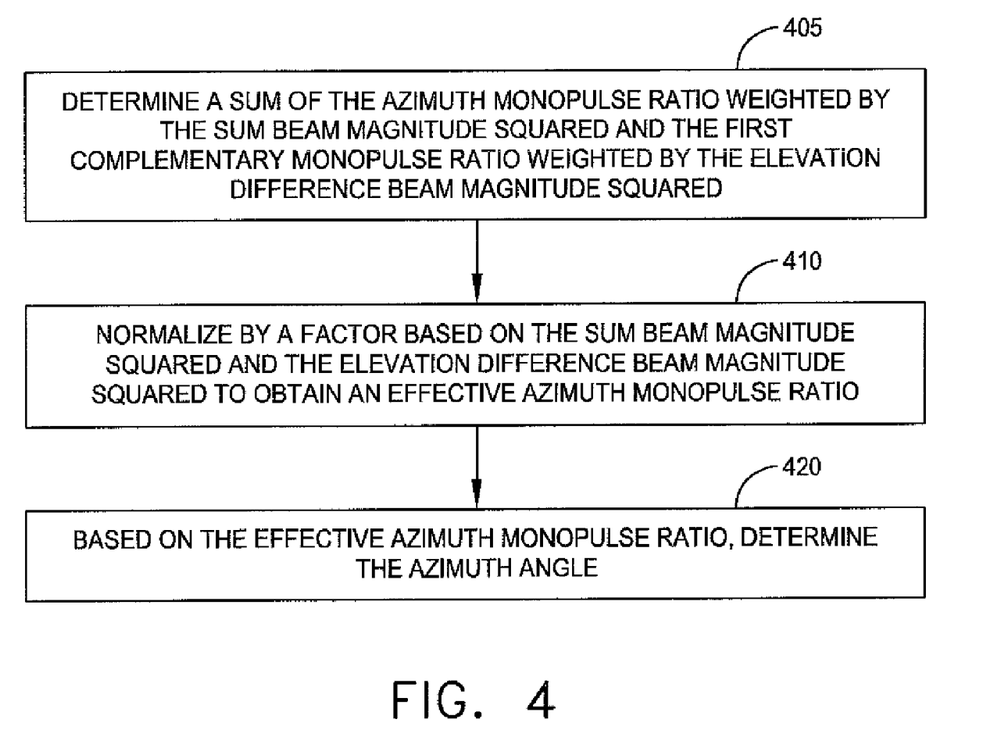
FIG. 4 is a process flow diagram of exemplary steps in a process of determining an azimuth angle in the process of FIG. 3.

FIG. 4 is a process flow diagram of steps in a process of determining an azimuth angle in the process of FIG. 3. These steps may be executed, for example, by processor 220 of FIG. 2. In an embodiment, an effective azimuth monopulse ratio may be determined, based on the azimuth monopulse ratio and the first complementary monopulse ratio. In determining the effective azimuth monopulse ratio, a sum of the azimuth monopulse ratio weighted by the square of the sum beam magnitude and the first complementary monopulse ratio weighted by the square of the elevation difference beam magnitude may be determined 405. The azimuth monopulse ratio may be weighted by a square of the sum beam magnitude and the first complementary monopulse ratio may be weighted by a square of the elevation difference beam magnitude. The sum may be normalized 410 by a factor based on the sum of the square of the magnitude of the sum beam and the square of the magnitude of the elevation difference beam to obtain the effective azimuth monopulse ratio. The azimuth angle may be determined 420 based on the determined effective azimuth monopulse ratio from a table correlating monopulse ratios and azimuth angles. Tables correlating monopulse ratios and azimuth angles are well known to those of ordinary skill in the art. In the alternative, the azimuth angle may be determined based on the determined effective azimuth monopulse ratio from a one-dimensional polynomial function; those of ordinary skill in the art are able to derive suitable one-dimensional polynomial functions.

In an embodiment, the effective azimuth monopulse ratio may be expressed by a formula based on a linear combination of the azimuth monopulse ratio weighted by a square of the sum beam magnitude and the first complementary monopulse ratio weighted by a square of the elevation difference beam magnitude. In an embodiment, the effective azimuth monopulse ratio may be expressed by the formula $$\frac{|\Sigma|^2 mr_{u_1} + |\Delta_E|^2 mr_{u_2}}{|\Sigma|^2 + |\Delta_E|^2},$$

where $mr_{u_1}$ is the azimuth monopulse ratio, $mr_{u_2}$ is the first complementary monopulse ratio, $|\Sigma|$ is the sum beam magnitude, and $|\Delta_E|$ is the magnitude of the elevation difference beam. In this formula, the azimuth monopulse ratio is weighted by the square of the magnitude of the sum beam, the first complementary monopulse ratio is weighted by the square of the magnitude of the elevation difference beam, and the sum is normalized by the sum of the magnitude squared of the sum beam and the magnitude squared of the elevation difference beam.

The weighting balances the contribution of the two monopulse ratios according to the antenna beam gains on the target. When the target is close to the peak of the sum beam, the conventional monopulse ratio provides a high degree of accuracy and dominates the complementary monopulse ratio. The complementary monopulse ratio becomes significant when the target is on the edge of beam or outside the beam.

The formula for determining the azimuth angle, or a function such as the directional cosine $\hat{u}$, from a table, may be expressed as $$\hat{u} = f^{-1}\left(\frac{|\Sigma|^2 mr_{u_1} + |\Delta_E|^2 mr_{u_2}}{|\Sigma|^2 + |\Delta_E|^2}\right).$$

Figure 5:
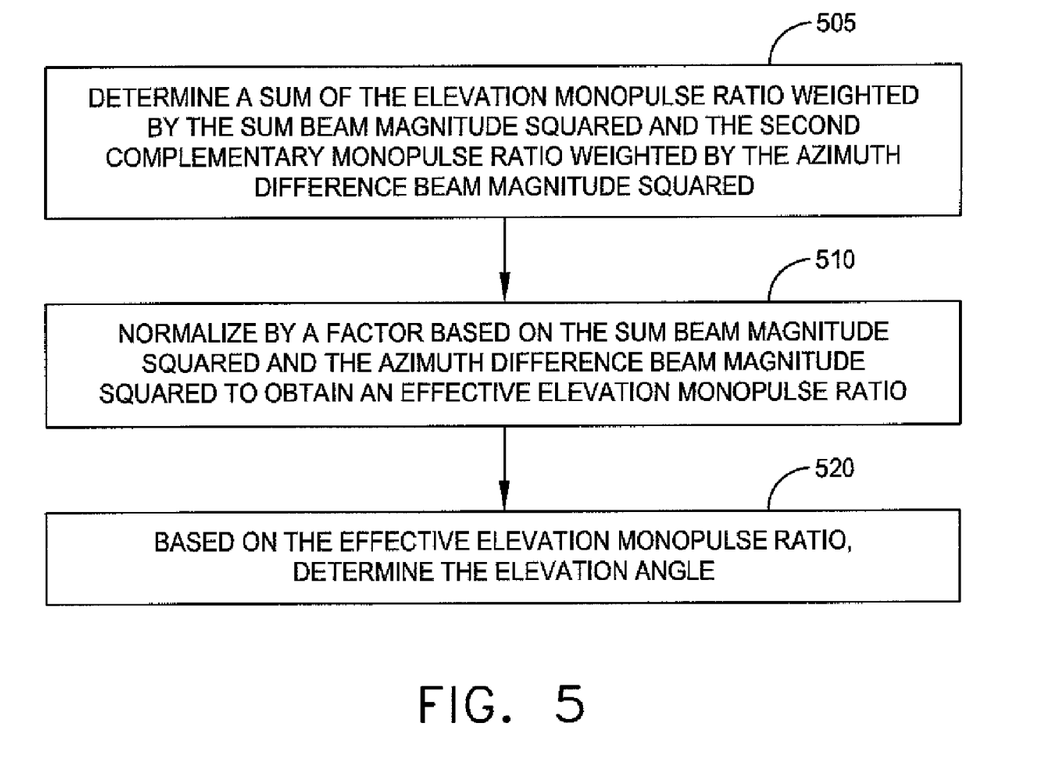
FIG. 5 is a process flow diagram of exemplary steps in a process of determining an elevation angle in the process of FIG. 3.

Referring now to FIG. 5, a process flow diagram is provided of steps in a process of determining an elevation angle in the process of FIG. 3. These steps may be executed, for example, by processor 220 of FIG. 2. In an embodiment, an effective elevation monopulse ratio may be determined, based on the elevation monopulse ratio and the first complementary monopulse ratio. In determining the effective elevation monopulse ratio, a sum of the elevation monopulse ratio weighted by the square of the sum beam magnitude and the second complementary monopulse ratio weighted by the square of the azimuth difference beam magnitude may be determined 505. The elevation monopulse ratio may be weighted by a square of the sum beam magnitude and the second complementary monopulse ratio may be weighted by a square of the azimuth difference beam magnitude. The sum may be normalized 510 by a factor based on the sum of the square of the magnitude of the sum beam and the square of the magnitude of the azimuth difference beam to obtain the effective elevation monopulse ratio. The elevation angle may be determined 520 based on the determined effective elevation monopulse ratio from a table correlating monopulse ratios and elevation angles. Tables correlating monopulse ratios and elevation angles are well known to those of ordinary skill in the art. In the alternative, the elevation angle may be determined based on the determined effective elevation monopulse ratio from a polynomial function; those of ordinary skill in the art are able to derive suitable polynomial functions.

In an embodiment, a formula based on a linear combination of the elevation monopulse ratio weighted by a square of the sum beam magnitude and the second complementary monopulse ratio weighted by a square of the azimuth difference beam. In an embodiment, the effective elevation monopulse ratio may be expressed by the $$\text{formula } \frac{|\Sigma|^2 mr_{v_1} + |\Delta_A|^2 mr_{v_2}}{|\Sigma|^2 + |\Delta_A|^2},$$

where $mr_{v_1}$ is the elevation monopulse ratio, $mr_{v_2}$ is the second complementary monopulse ratio, $|\Sigma|$ is the sum beam magnitude, and $|\Delta_A|$ is the magnitude of the azimuth difference beam. In this formula, the elevation monopulse ratio is weighted by the square of the magnitude of the sum beam, the second complementary monopulse ratio is weighted by the square of the magnitude of the azimuth difference beam, and the sum is normalized by the sum of the magnitude squared of the sum beam and the magnitude squared of the azimuth difference beam.

As with the calculation of the effective azimuth monopulse ratio, the weighting of the monopulse ratios in the calculation of the effective elevation monopulse ratio balances the contribution of the two monopulse ratios according to the antenna beam gains on the target. When the target is close to the peak of the sum beam, the conventional monopulse ratio provides a high degree of accuracy and dominates the complementary monopulse ratio. The complementary monopulse ratio becomes significant when the target is on the edge of beam or outside the beam.

The formula for determining the elevation angle, or the directional cosine $\hat{v}$, from a table may be expressed as $$\hat{v} = g^{-1}\left(\frac{|\Sigma|^2 mr_{v_1} + |\Delta_A|^2 mr_{v_2}}{|\Sigma|^2 + |\Delta_A|^2}\right),$$

where the variables have the same identities as set forth above.

Figure 6:
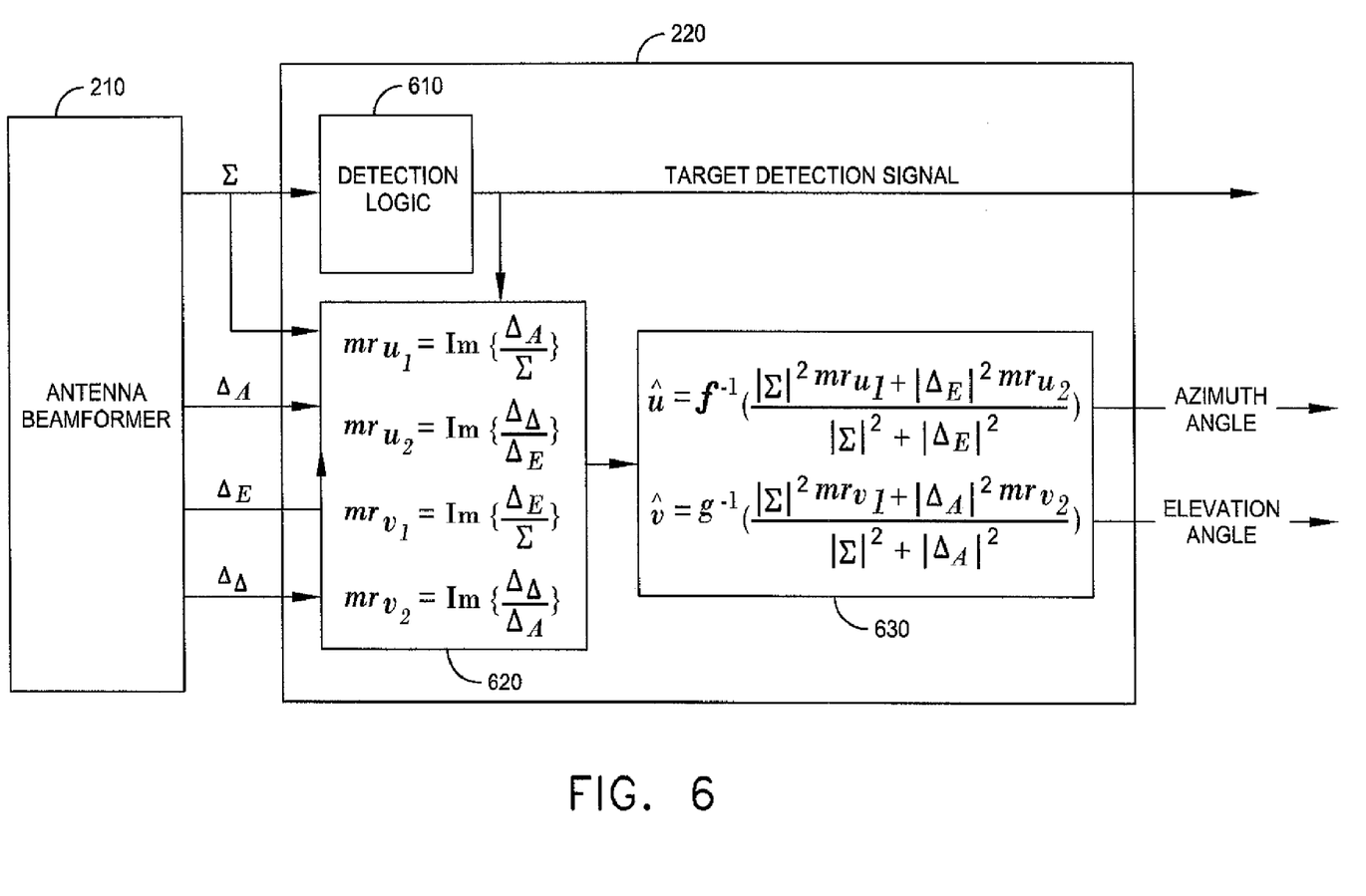
FIG. 6 is a schematic diagram illustrating exemplary formulas executed by a processor in carrying out the process of FIG. 3.

Referring now to FIG. 6, antenna beamformer 210 outputs the sum beam, azimuth difference beam, elevation difference beam, and delta-delta (or double difference) beam to processor 220. Processor 220 applies target detection logic 610 to the sum beam. The target detection logic may be a comparison between the sum beam magnitude and a threshold for each pulse, with a target detected signal being provided as an output when the magnitude is found to exceed the threshold. The target detected signal may be provided as a signal to cause the processor 220 to calculate monopulse ratios, as indicated at block 620. The azimuth monopulse ratio, elevation monopulse ratio, first complementary monopulse ratio, and second monopulse ratio may be calculated, as explained above. Processor 220 stores the calculated monopulse ratios and then calculates the effective monopulse ratios, using the first and second complementary monopulse ratios. Processor 220 then obtains the elevation and azimuth angles, or equivalent thereof, corresponding to the effective monopulse ratios, from a look up table. The angles, or equivalents thereof, are then provided as output signals by processor 220. The processor 220 may also provide an output signal indicating that a target has been detected.

By way of non-limiting example, antenna beamformer 210 may be an analog beamformer associated with the Aegis and TPS-59 radar systems. By way of further non-limiting example, antenna beamformer 210 may be a next generation radar with a digital beamformer.

Figure 7:
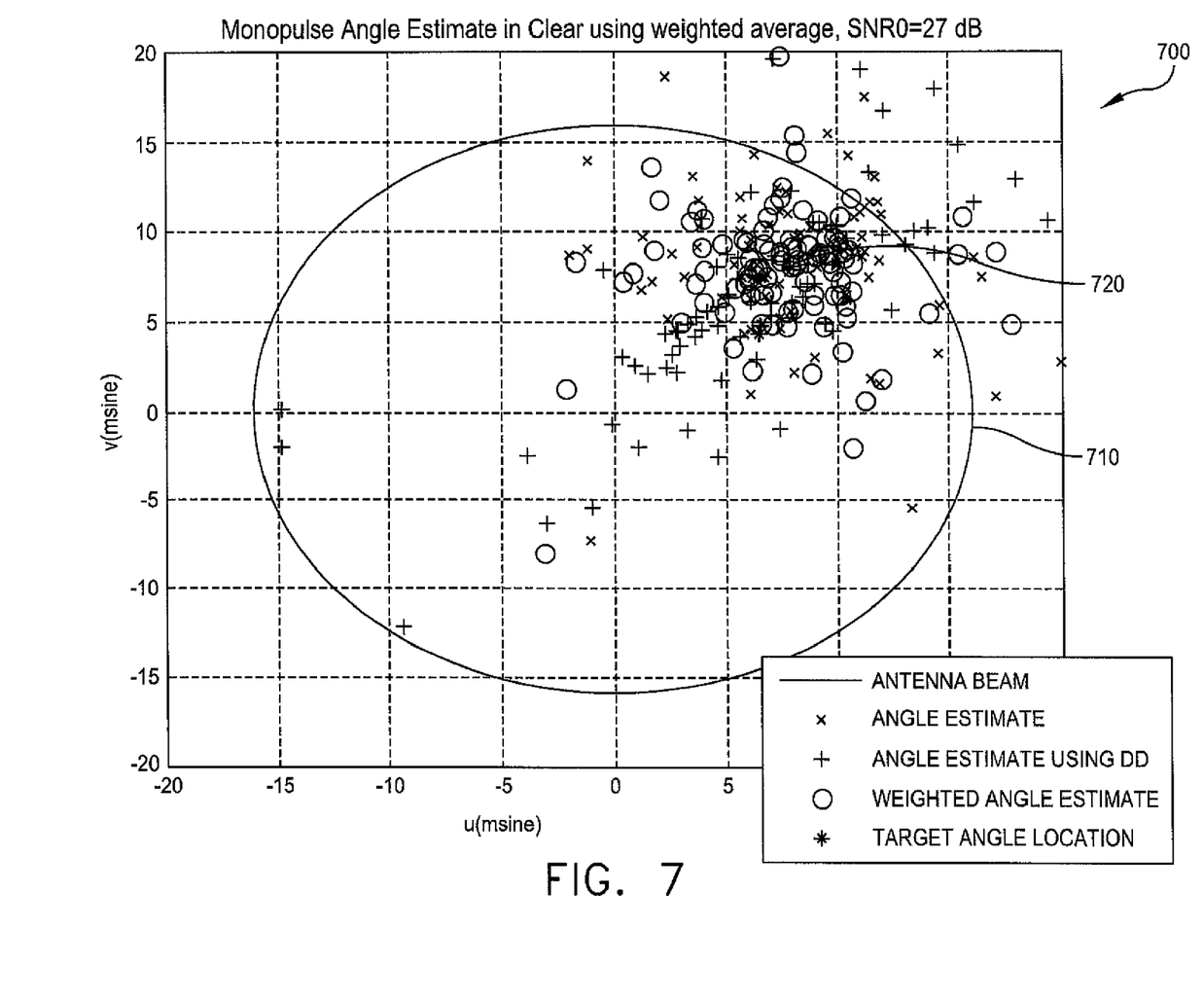
FIG. 7 is a graph showing simulation results comparing a prior art method and a method according to an embodiment of the invention.

Referring to FIG. 7, a graph 700 illustrates the result of a simulation of one hundred monopulse readings, using conventional monopulse ratios, delta-delta monopulse ratios, and weighted monopulse ratios, for a target 720 within the beam 710 and having signal to noise ratio of 27 dB at the boresight. The results are shown in Table 1:

TABLE 1

|  | u RMSE (msine) | v RMSE (msine) | Total RMSE (msine) |
|---|---|---|---|
| Sum-Delta Monopulse | 4.83 | 4.01 | 6.28 |
| Delta-Delta Monopulse | 7.84 | 15.39 | 17.27 |
| Weighted Monopulse | 4.35 | 3.74 | 5.74 |

As can be seen from Table 1, the simulation shows a lower root mean square error using the weighted monopulse method as described above in connection with FIGS. 3, 4 and 5, and using the particular weighting and normalization factors set forth in FIG. 6, for example.

Figure 8:
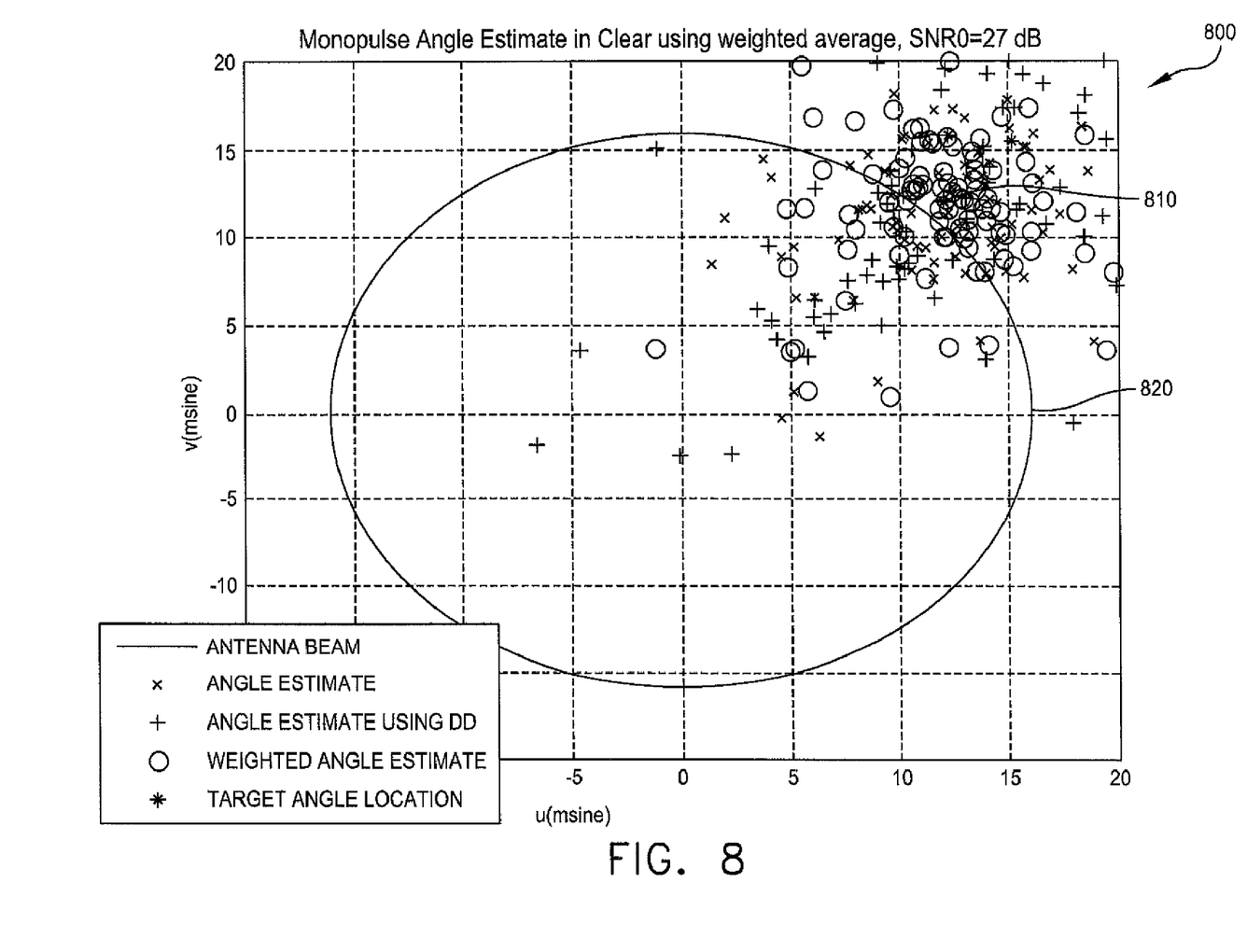
FIG. 8 is a graph showing simulation results comparing a prior art method and a method according to an embodiment of the invention.

Referring to FIG. 8, the result of a simulation is shown as a chart 800, which is the same as the simulation of FIG. 7, except that the target 810 is outside the beamwidth 820. The results are shown in Table 2:

TABLE 2

|  | u RMSE (msine) | v RMSE (msine) | Total RMSE (msine) |
|---|---|---|---|
| Sum-Delta Monopulse | 7.64 | 5.64 | 9.49 |
| Delta-Delta Monopulse | 11.13 | 7.81 | 13.60 |
| Weighted Monopulse | 4.28 | 3.88 | 5.78 |

As can be seen from Table 2, the root mean square error (RMSE) is significantly less for processing using the weighted monopulse approach than the sum-delta monopulse approach, even with a target outside the beam.

Figure 9:
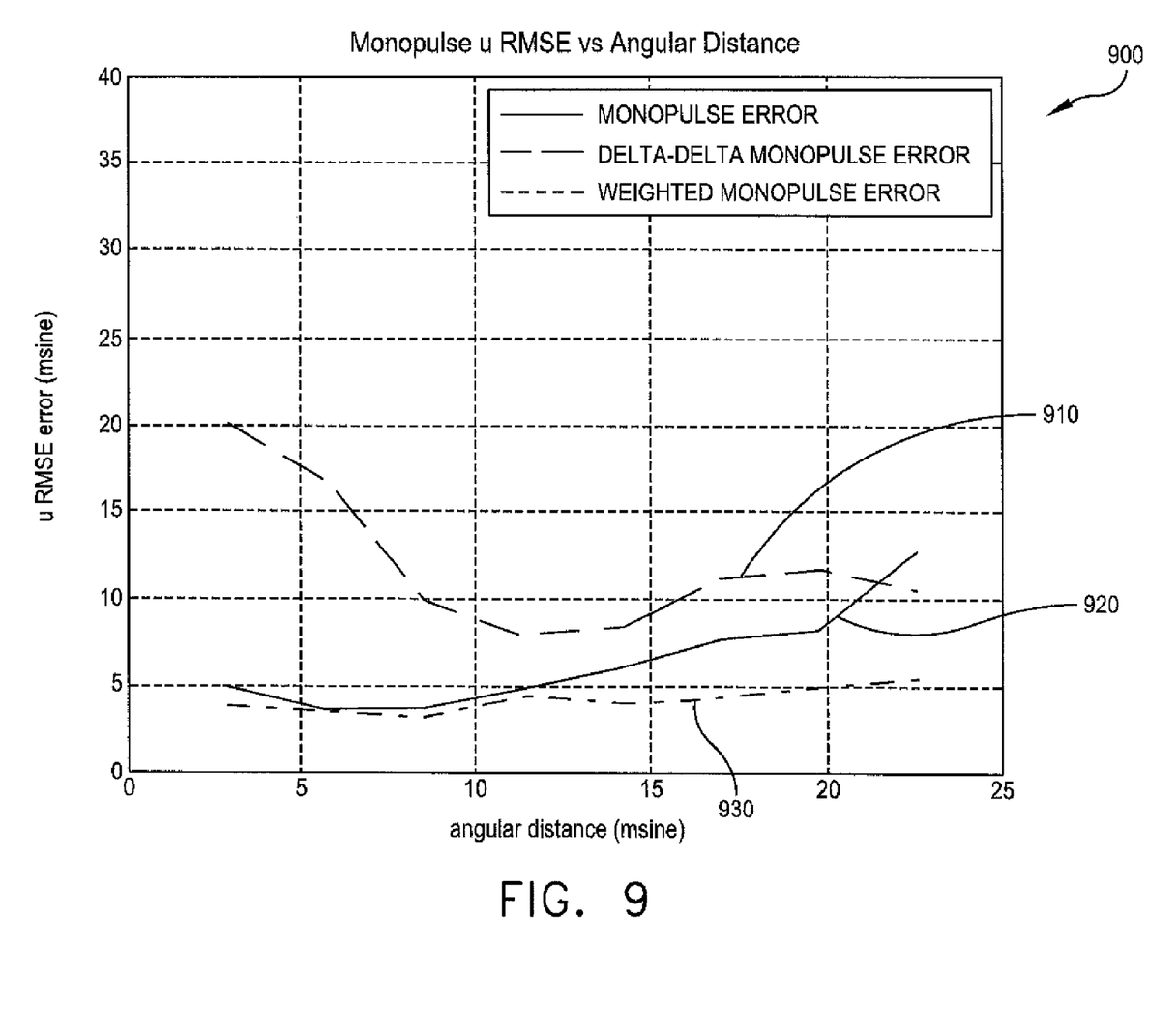
FIG. 9 is a graph showing the results of a simulation by plotting RMSE versus angular distance from the boresight for a prior art approach and an approach in accordance with an embodiment of the invention.
Figure 10:
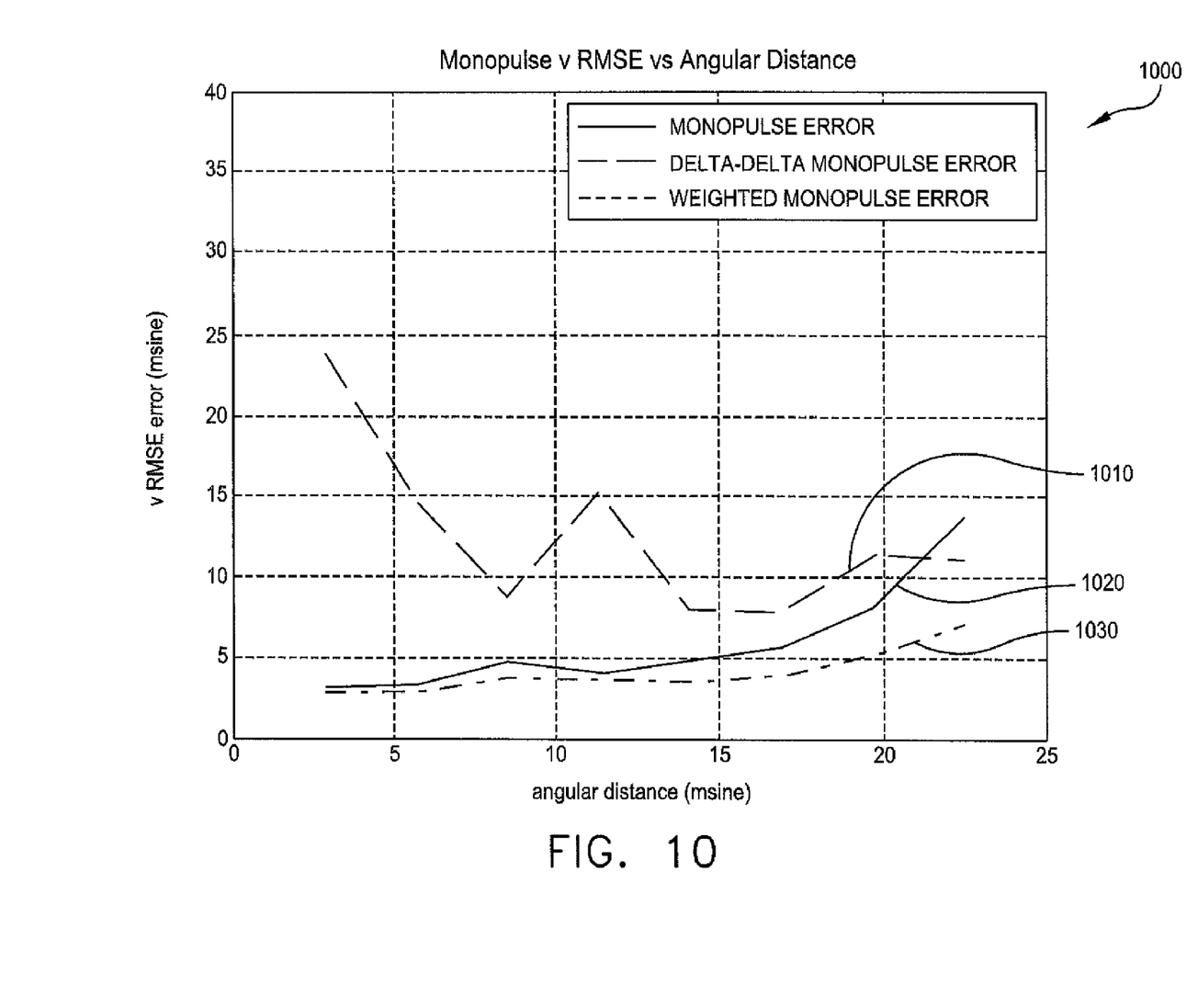
FIG. 10 is a graph showing the results of a simulation by plotting RMSE versus angular distance from the boresight for a prior art approach and an approach in accordance with an embodiment of the invention.

Referring to FIGS. 9 and 10, the results of the simulations are shown plotting RMSE versus angular distance from the boresight for a prior art approach and an approach in accordance with an embodiment of the invention. In FIG. 9, chart 900 illustrates the azimuth angle RMSE. The RMSE based on the delta-delta beam 910 is shown, generally decreasing as angle off boresight increases. The error based on conventional monopulse calculation 920 is shown, generally increasing with angle off boresight. The error 930 in the angle provided by an implementation of the method of the invention is shown to be less than the error provided by either the conventional monopulse ratio or the delta-delta beam monopulse error. In FIG. 10, the elevation angle RMS error is shown in chart 1000. The error 1010 in the angle derived from the delta-delta beam monopulse is shown, generally decreasing as the angle off boresight increases. The error 1020 in the angle derived from a conventional monopulse is shown, generally increasing as the angle of boresight increases. The error 1030 in the angle derived from a method according to the invention is shown An analog beamforming system and the full monopulse set including the delta-delta beam can be generated in two stages. First, the sum and difference of the element voltages for each column in the array are determined. The resulting column beams can be row summed and differenced to form the sum beam, the delta-azimuth beam, the delta-elevation beam and the delta-delta beam respectively. Alternatively, row beams can be defined, and the row beam column summed and differenced to form the four beams.

In digital beamforming systems, the delta-delta beam can be generated via digital calculation by using appropriate delta-delta beamforming coefficients. Such coefficients are well known to those of ordinary skill in the art.

It will be appreciated that reference to azimuth and elevation angles are references to any two coordinates for locating an object by a radar, and are not limited to particular orientations relative to an array or to any reference. The terms rows and columns merely reference two coordinates on the radar array, and are not limited to any particular arrangement of elements on a radar array; for example, there is no limitation to two linear dimensions of elements. It will be appreciated that the radar arrays may be of any suitable orientation. Any of the radar arrays noted in this application may be rectangular in form, as a non-limiting example.

Exemplary advantages of a method and system in accordance with the present invention include lower estimation error in target angle determination, particularly near the edge of the beam and beyond the edge of the beam, as compared to using only the conventional monopulse ratios. The rate of outlier target angle determinations is reduced.

While the foregoing invention has been described with reference to the above-described embodiment, various modifications and changes can be made without departing from the spirit of the invention. Accordingly, all such modifications and changes are considered to be within the scope of the appended claims.

What is claimed is:

1. A computer-implemented method for determining target angles based on data received from a monopulse radar array antenna, comprising the steps of:

receiving by a processor of the computer, from a beamformer that generates beams from signals generated by the monopulse radar array antenna, signals having data indicative of a sum beam, an azimuth difference beam, an elevation difference beam, and a delta-delta beam;

based on the received signals, determining by the processor an azimuth monopulse ratio, an elevation monopulse ratio, a first complementary monopulse ratio based on the ratio of the delta-delta beam to the delta elevation beam, and a second complementary monopulse ratio based on the ratio of the delta-delta beam to the delta azimuth beam;

determining an azimuth angle by the processor based on the azimuth monopulse ratio and the first complementary monopulse ratio;

determining an elevation angle by the processor based on the elevation monopulse ratio and the second complementary monopulse ratio;

providing an output signal indicative of the azimuth angle; and providing an output signal indicative of the elevation angle.

2. The method of claim 1, wherein, in the step of determining an azimuth angle, an effective azimuth monopulse ratio is determined based on the azimuth monopulse ratio weighted by the sum beam magnitude squared and the first complementary monopulse ratio weighted by the square of the elevation difference beam magnitude.

3. The method of claim 2, wherein the determining of the effective azimuth monopulse ratio comprises weighting the azimuth monopulse ratio by a square of the sum beam magnitude and weighting the first complementary monopulse ratio by a square of the elevation difference beam magnitude.

4. The method of claim 1, wherein, in the step of determining an elevation angle, an effective elevation monopulse ratio is determined based on the elevation monopulse ratio weighted by a square of the sum beam magnitude and the second complementary monopulse ratio weighted by a square of the azimuth difference beam magnitude.

5. The method of claim 4, wherein the determining of the effective elevation monopulse ratio comprises weighting the elevation monopulse ratio by a square of the sum beam magnitude and weighting the second complementary monopulse ratio by a square of the azimuth difference beam magnitude.

6. The method of claim 1, wherein the step of determining an azimuth angle comprises determining an effective azimuth monopulse ratio based on the azimuth monopulse ratio weighted by a square of the sum beam magnitude and the first complementary monopulse ratio weighted by a square of the elevation difference beam magnitude, and determining the azimuth angle based on the determined effective azimuth monopulse ratio from a table correlating monopulse ratios and azimuth angles; and the step of determining an elevation angle comprises determining an effective elevation monopulse ratio based on the elevation monopulse ratio weighted by a square of the sum beam magnitude and the second complementary monopulse ratio weighted by a square of the azimuth difference beam magnitude; and determining the elevation angle based on the determination effective elevation monopulse ratio from a table correlating monopulse ratios and elevation angles.

7. A system for determining target angles based on data received from a monopulse radar array antenna, comprising;
a memory device;
a processor coupled to the memory device, the processor adapted to:
receive from a beamformer that generates beams from signals generated by the monopulse radar array antenna, signals having data indicative of a sum beam, an azimuth difference beam, an elevation difference beam, and a delta-delta beam;
based on the received signals, determine an azimuth monopulse ratio, an elevation monopulse ratio, a first complementary monopulse ratio based on the ratio of the delta-delta beam to the delta elevation beam, and a second complementary monopulse ratio based on the ratio of the delta-delta beam to the delta azimuth beam;
determine an azimuth angle based on the azimuth monopulse ratio and the first complementary monopulse ratio;
determine an elevation angle based on the elevation monopulse ratio and the second complementary monopulse ratio;
provide an output signal indicative of the azimuth angle; and
provide an output signal indicative of the elevation angle.

8. The system of claim 7, wherein the processor is further adapted to determine, in determining an azimuth angle, an effective azimuth monopulse ratio based on the azimuth monopulse ratio weighted by a square of the sum beam magnitude and the first complementary monopulse ratio weighted by a square of the elevation difference beam magnitude.

9. The system of claim 8, wherein the processor is further adapted to weight, in determining the effective azimuth monopulse ratio, the azimuth monopulse ratio by a square of the sum beam magnitude and the first complementary monopulse ratio by a square of the elevation difference beam magnitude.

10. The system of claim 7, wherein the processor is further adapted to determine, in determining an elevation angle, an effective elevation monopulse ratio based on the elevation monopulse ratio weighted by a square of the sum beam magnitude and the second complementary monopulse ratio weighted by a square of the azimuth difference beam magnitude.

11. The system of claim 10, wherein the processor is further adapted to weight, in determining the effective elevation monopulse ratio, the elevation monopulse ratio by a square of the sum beam magnitude and the second complementary monopulse ratio by a square of the azimuth difference beam magnitude.

12. The system of claim 7, wherein the processor is further adapted to determine, in determining an azimuth angle, an effective azimuth monopulse ratio based on the azimuth monopulse ratio weighted by a square of the sum beam magnitude and the first complementary monopulse ratio weighted by a square of the elevation difference beam magnitude, and to determine the azimuth angle based on the determined effective azimuth monopulse ratio from a table correlating monopulse ratios and azimuth angles; and, in determining an elevation angle, to determine an effective elevation monopulse ratio based on the elevation monopulse ratio weighted by a square of the sum beam magnitude and the second complementary monopulse ratio weighted by a square of the azimuth difference beam magnitude; and to determine the elevation angle based on the determined effective elevation monopulse ratio from a table correlating monopulse ratios and elevation angles.

13. A method for determining target angles based on data received from a monopulse radar array antenna having a plurality of elements comprising the steps of:
forming by a beamformer based on signals generated by the monopulse rectangular radar array antenna signals having data indicative of a sum beam, an azimuth difference beam, an elevation difference beam, and a delta-delta beam;
based on the received signals, determining by the processor an azimuth monopulse ratio, an elevation monopulse ratio, a first complementary monopulse ratio based on the ratio of the delta-delta beam to the delta elevation beam, and a second complementary monopulse ratio based on the ratio of the delta-delta beam to the delta azimuth beam;
determining an azimuth angle by the processor based on the azimuth monopulse ratio and the first complementary monopulse ratio;
determining an elevation angle by the processor based on the elevation monopulse ratio and the second complementary monopulse ratio;
providing an output signal indicative of the azimuth angle; and
providing an output signal indicative of the elevation angle.

14. The method of claim 13, wherein the step of forming comprises determining a sum of the element voltages for each column of elements and determining a difference of the element voltages for each column to determine column beams, and determining a row sum and a row difference based on the column beams, to obtain the monopulse beams.

15. The method of claim 14, wherein the step of forming is performed by an analog beamformer.

16. The method of claim 13, wherein the step of forming is performed by a digital beamformer.

17. The method of claim 13, further comprising the storing of the determined elevation angle and azimuth angle by the processor in a memory device.

18. The method of claim 13, further comprising the step of receiving the output signals by a display device and display of a visual indication of the azimuth angle and the elevation angle by the display device.

19. The method of claim 13, further comprising the step of comparing by the processor a magnitude of the sum beam to a threshold, and providing by the processor a target detection signal if the magnitude of the sum beam exceeds the threshold.

20. The method of claim 19, further comprising the step of terminating calculation of the azimuth angle and elevation angle if the magnitude of the sum beam is less than the threshold.

* * * * *